United States Patent
Trzynadlowski et al.

(10) Patent No.: US 11,768,535 B1
(45) Date of Patent: Sep. 26, 2023

(54) PRESENTING COMPUTER-GENERATED CONTENT BASED ON EXTREMITY TRACKING

(71) Applicant: Apple Inc., Cupertino, CA (US)

(72) Inventors: Bart Colin Trzynadlowski, Reno, NV (US); Gregory Patrick Lane Lutter, Boulder Creek, CA (US); Thomas G. Salter, Foster City, CA (US); Rahul Nair, Santa Clara, CA (US); Devin William Chalmers, Oakland, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/237,665

(22) Filed: Apr. 22, 2021

Related U.S. Application Data

(60) Provisional application No. 63/026,257, filed on May 18, 2020.

(51) Int. Cl.
*G06F 3/01* (2006.01)

(52) U.S. Cl.
CPC .................... *G06F 3/011* (2013.01)

(58) Field of Classification Search
None
See application file for complete search history.

(56) References Cited

U.S. PATENT DOCUMENTS

| | | | |
|---|---|---|---|
| 8,493,198 B1 | 7/2013 | Vasquez et al. | |
| 9,310,874 B2 | 4/2016 | Gunn et al. | |
| 9,819,537 B2 | 11/2017 | Palin et al. | |
| 9,860,204 B2 | 1/2018 | Touloumtzis | |
| 10,121,355 B1 | 11/2018 | Mossoba et al. | |
| 2014/0225918 A1* | 8/2014 | Mittal | G06F 3/017 345/633 |
| 2015/0022444 A1* | 1/2015 | Ooi | G06V 20/20 345/156 |
| 2017/0255262 A1 | 9/2017 | Liu | |
| 2021/0089475 A1* | 3/2021 | Mathur | G06F 3/011 |
| 2021/0132683 A1* | 5/2021 | Herling | G06V 10/44 |
| 2021/0165484 A1* | 6/2021 | Suguhara | G09G 5/00 |

FOREIGN PATENT DOCUMENTS

WO 2017131748 A1 8/2017

* cited by examiner

*Primary Examiner* — David D Davis
(74) *Attorney, Agent, or Firm* — Fernando & Partners, LLP

(57) ABSTRACT

A method is performed at an electronic device including one or more processors, a non-transitory memory, and a first input device. The method includes detecting, via the first input device, an input directed to a first location within a physical environment. The first location is identified by an extremity tracking function based on the input. The method includes determining an interaction event based on a function of a semantic identifier that is associated with a portion of the first location. The method includes presenting computer-generated content that is a function of the interaction event.

28 Claims, 21 Drawing Sheets

PRESENTING COMPUTER-GENERATED CONTENT BASED ON EXTREMITY TRACKING

CROSS-REFERENCE TO RELATED APPLICATION

This application claims priority to U.S. Provisional Patent App. No. 63/026,257 filed on May 18, 2020, which is hereby incorporated by reference in its entirety.

TECHNICAL FIELD

The present disclosure relates to presenting computer-generated content, and, in particular, presenting computer-generated content based on extremity tracking.

BACKGROUND

In various circumstances, a system monitors an application running on the system, and provides historical application information based on the monitoring. For example, the historical application information may indicate an amount of time that an application has been running during the past week. However, the system is not equipped to provide an indicator indicating a user interaction within an application, or an indicator indicating a user interaction directed to within an operating environment, independent of an application. Accordingly, the historical application information, provided by the system, is crude and often lacks meaningful context.

SUMMARY

In accordance with some implementations, a method is performed at an electronic device with one or more processors, a non-transitory memory, and a first input device. The method includes detecting, via the first input device, an input directed to a first location within a physical environment. The first location is identified by an extremity tracking function based on the input. The method includes determining an interaction event based on a function of a semantic identifier that is associated with a portion of the first location. The method includes presenting computer-generated content that is a function of the interaction event.

In accordance with some implementations, an electronic device includes one or more processors, a non-transitory memory, and a first input device. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

SUMMARY

Figure 1:
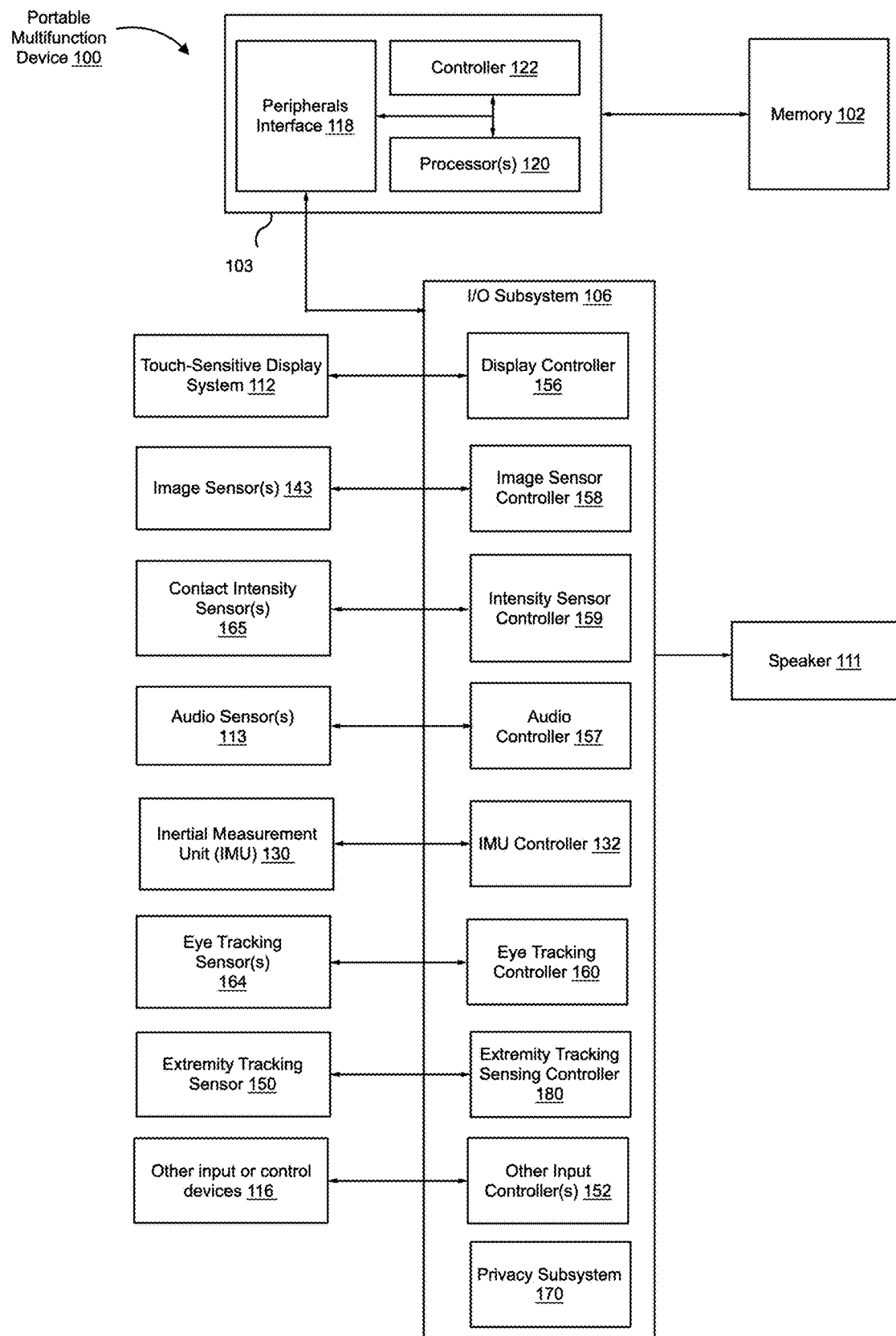
FIG. 1 is a block diagram of an example of a portable multifunction device in accordance with some implementations.

In various circumstances, a system (e.g., a computing system) monitors an application running on the system, and provides historical application information based on the monitoring. The historical application information may indicate an amount of time the system has been displaying an application window during a predetermined amount of time (e.g., during the past week). For example, the system displays that "today, you used the email application for two hours and the video streaming application for three hours." The historical application information is independent of a user interaction within an application, such as a user interaction with respect to content displayed within an application window. Moreover, the historical application information does not account for a user interaction with respect to an operating environment, such as a physical environment or an augmented reality (AR) environment. As a result, the historical application information is crude and lacks meaningful context.

By contrast, various implementations disclosed herein include methods, electronic devices, and systems for presenting computer-generated content based on an interaction event with respect to a physical environment. To that end, an electronic device detects an input directed to a location within the physical environment. The first location is identified by an extremity tracking function based on the input. The electronic device determines an interaction event based on a function of a semantic identifier that is associated with a portion of the first location. For example, the electronic device semantically identifies a physical object (e.g., a doorknob, a video game controller, a basketball, etc.) that is within a threshold distance from the location identified by the extremity tracking function. The electronic device presents computer-generated content that is a function of the interaction event, such as by displaying a computer-generated notification or suggestion.

In some implementations, the electronic device determines whether the interaction event satisfies one or more interaction criteria. For example, the electronic device determines whether the interaction event corresponds to a transactional event or a liminal event with respect to the physical environment. As another example, the interaction event satisfies the one or more interaction criteria when the interaction event satisfies a temporal criterion, such as a user's hand holding a television controller for more than a threshold amount of time. In response, the electronic device may present computer-generated content based on the interaction event, such as displaying a suggestion to workout instead of continuing to watch television. Thus, by providing computer-generated content that is a function of the interaction event, the electronic device provides meaningful, context-based information, in contrast to the crude information provided by other systems.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joy-sticks, click wheels, and so forth. In some alternate implementations, the one or more input controllers 152 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a physical environment. In some implementations, the other input or control devices 116 include a depth sensor and/or a time of flight sensor that obtains depth information characterizing a physical environment.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a physical environment. In other implementations, other parts of the body (e.g., arms, legs, feet, head, etc.) can be tracked. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

FIGS. 2A-2I are an example of presenting computer-generated content based on extremity tracking in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

Figure 2A:
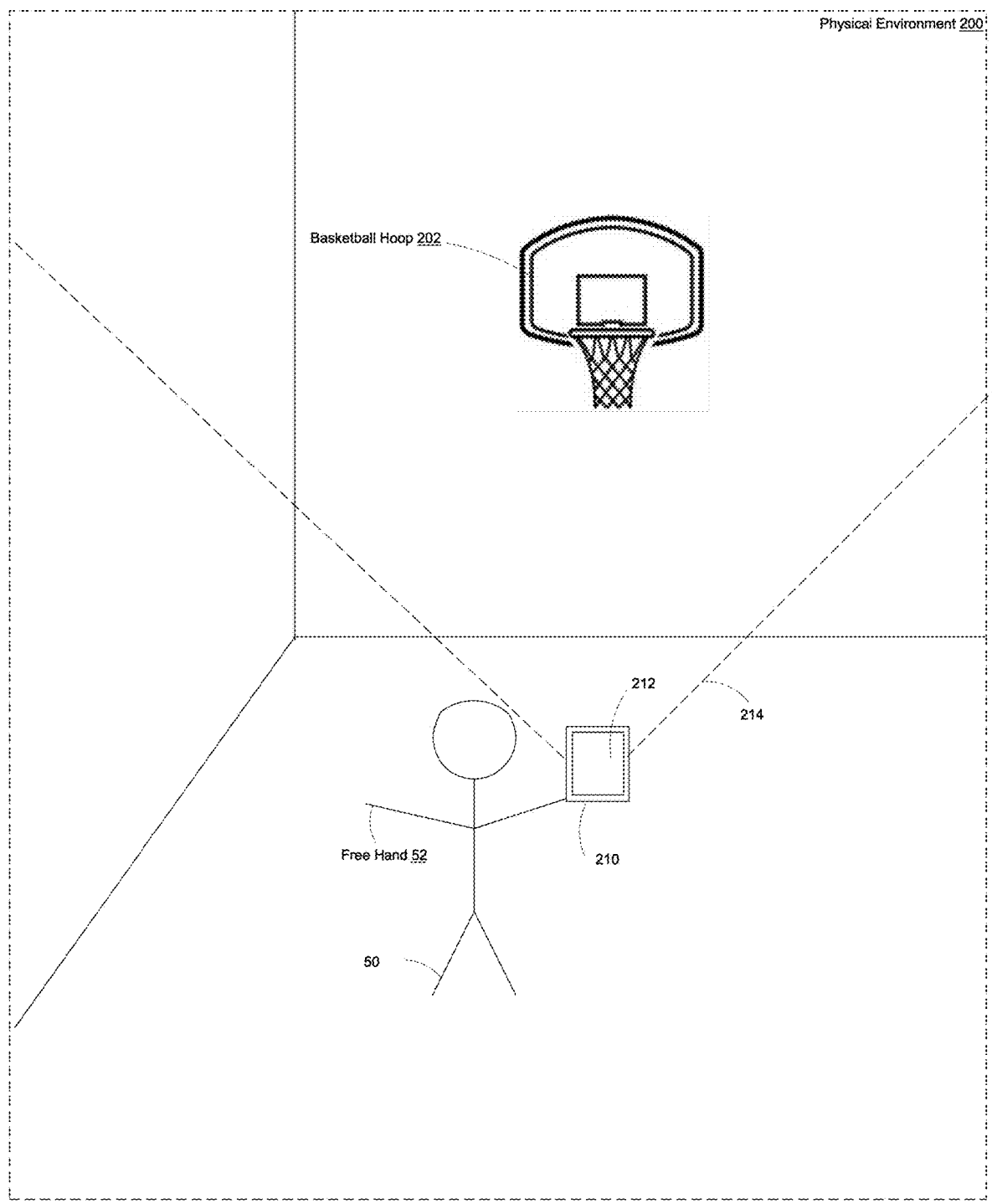
FIGS. 2A-2I are an example of presenting computer-generated content based on extremity tracking in accordance with some implementations.

As illustrated in FIG. 2A, a physical environment 200 includes a basketball hoop 202 and a user 50 holding an electronic device 210. Moreover, as will be described below, the electronic device 210 performs an extremity tracking function 220 with respect to a free hand 52 (e.g., the hand not holding the electronic device 210) of the user 50. In some implementations, the electronic device 210 corresponds to a mobile device, such as a smartphone, laptop, tablet, etc. In some implementations, the electronic device 210 is similar to and adapted from the electronic device 100 in FIG. 1.

In some implementations, the electronic device 210 corresponds to a head-mountable device (HMD) that includes an integrated display (e.g., a built-in display) that displays a physical environment 200. In some implementations, the electronic device 210 corresponds to an HMD that includes a see-through or transparent display through which the physical environment 200 can be directly viewed. In some implementations, the electronic device 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 210). For example, in some implementations, the electronic device 210 slides/snaps into or otherwise attaches to the head-mountable enclosure. In some implementations, the display of the device attached to the head-mountable enclosure presents (e.g., displays) the physical environment 200. For example, in some implementations, the electronic device 210 corresponds to a mobile phone that can be attached to the head-mountable enclosure. In various implementations, examples of the electronic device 210 include smartphones, tablets, media players, laptops, etc.

Figure 2B:
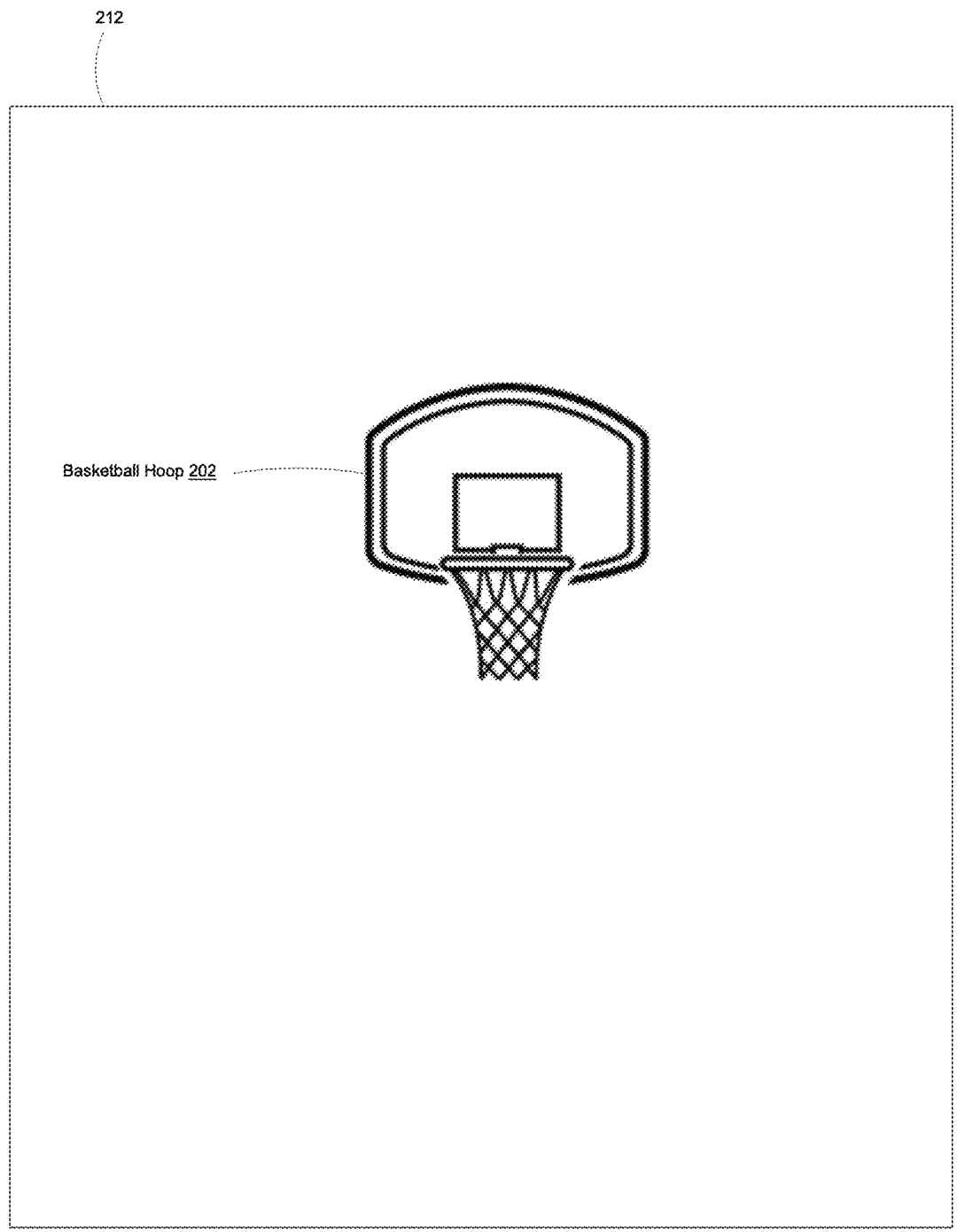

In some implementations, the electronic device 210 includes a display 212. The display 212 is associated with a field-of-view 214 that includes a portion of the physical environment 200, which includes the basketball hoop 202. Accordingly, as illustrated in FIG. 2B, the display 212 displays the basketball hoop 202.

Figure 2C:
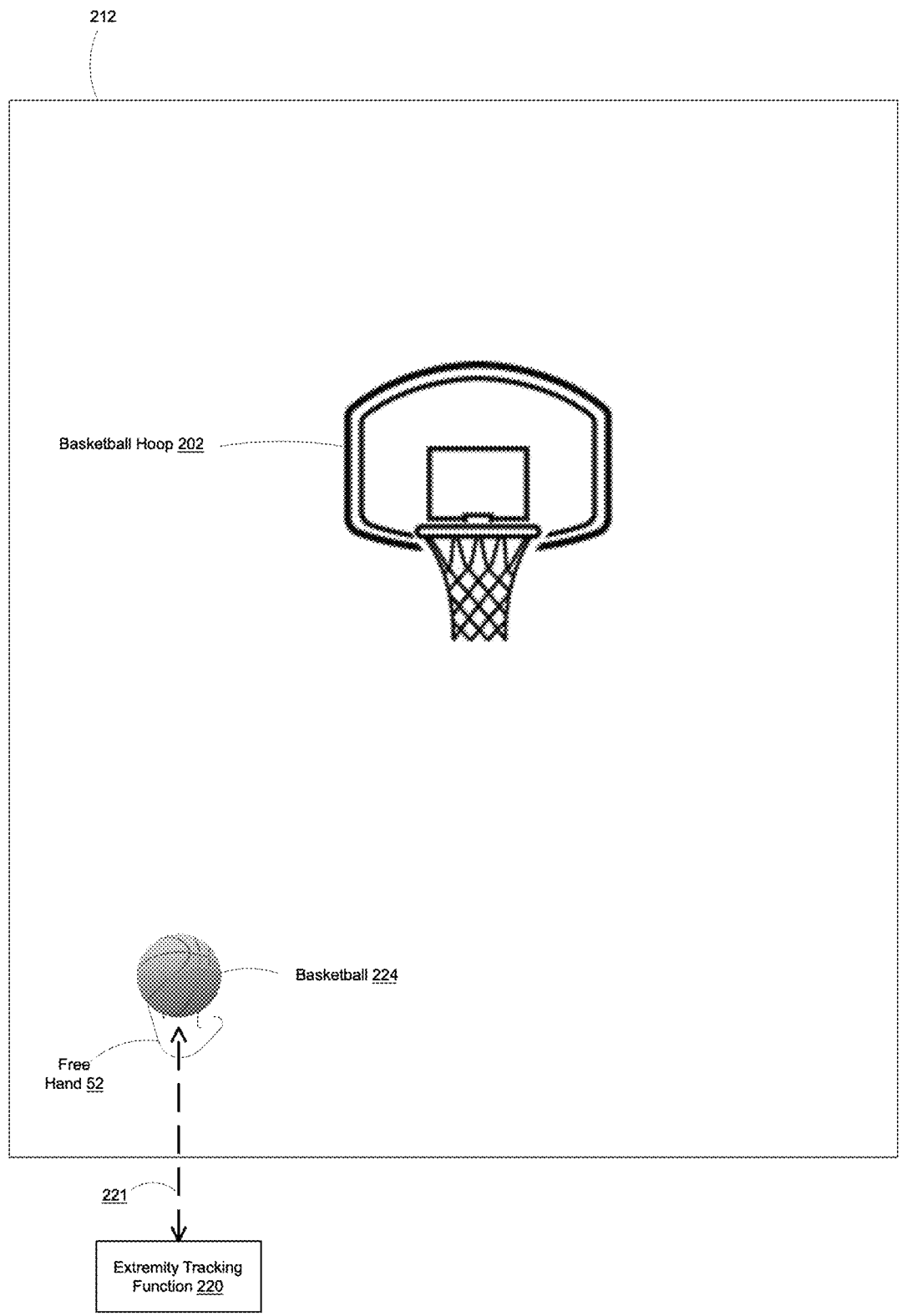

As illustrated in FIG. 2C, the free hand 52 of the user 50, holding a basketball 224, moves within the field-of-view 214. Accordingly, the display 212 displays the free hand 52 holding the basketball 224.

As further illustrated in FIG. 2C, the electronic device 210 performs an extremity tracking function 220 in order to identify a location, within the physical environment 200, corresponding to the free hand 52. The extremity tracking is indicated by tracking line 221, which is illustrated for purely explanatory purposes. For example, with reference to FIG. 1, the electronic device 210 includes the extremity tracking sensor 150. Continuing with this example, the extremity tracking sensor 150 obtains extremity tracking data that is indicative of a location of the free hand 52 within the physical environment 200. In some implementations, the extremity tracking function 220 tracks a particular finger of the free hand 52. In some implementations, the extremity tracking function 220 tracks multiple fingers of the free hand 52. For example, the extremity tracking function 220 tracks respective movements of fingers of the free hand 52 relative to each other and relative to the physical environment 200.

Figure 2D:
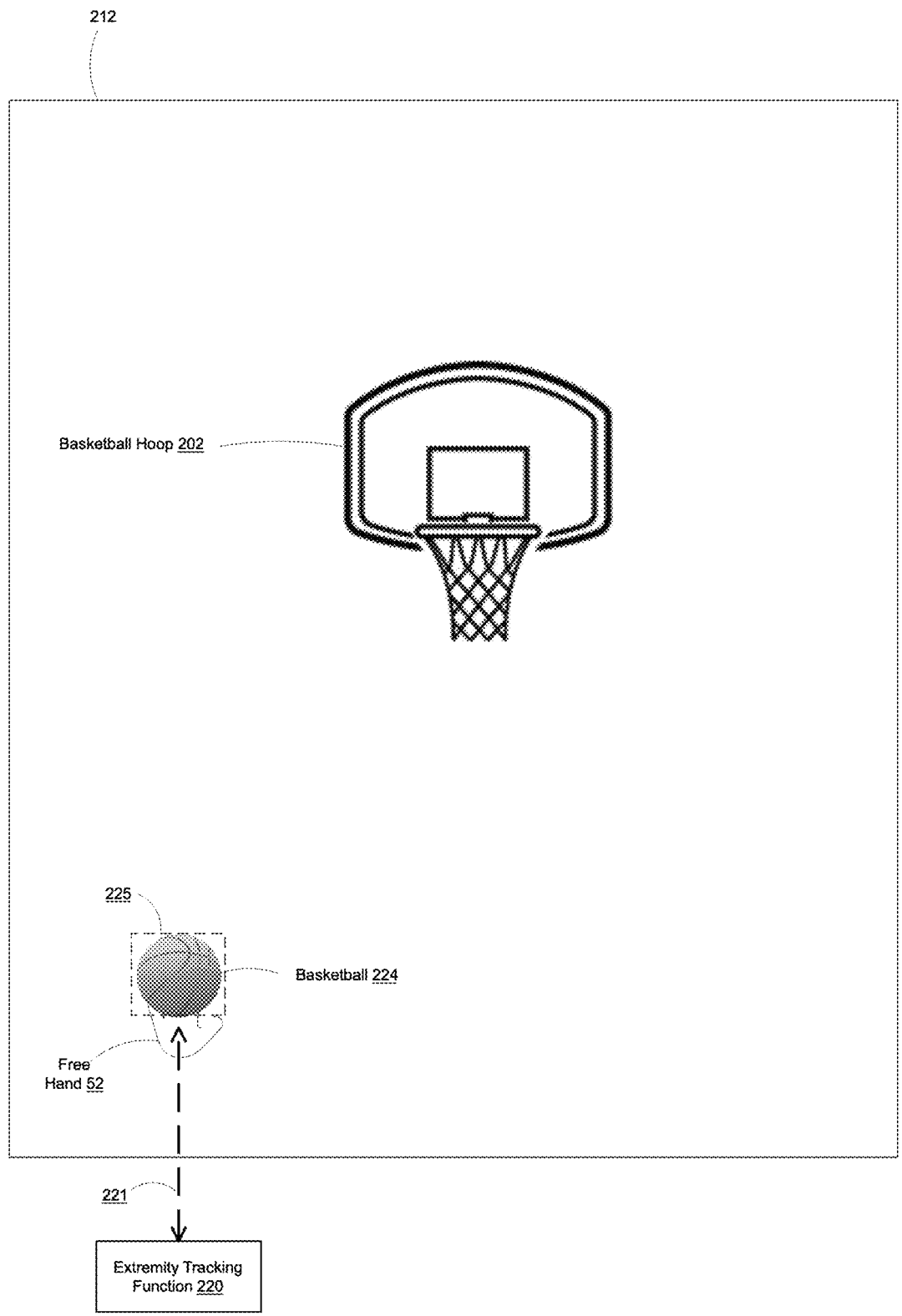

As illustrated in FIG. 2D, the electronic device 210 semantically identifies the basketball 224, as is indicated by object box 225. The object box 225 is illustrated for purely explanatory purposes. In some implementations, the electronic device 210 obtains a semantic identifier (e.g., "basketball") associated with the basketball 224. In some implementations, the electronic device 210 generates the semantic identifier, such as via a computer vision technique (e.g., semantic segmentation). In some implementations, the electronic device 210 includes a neural network that performs semantic segmentation with respect to the physical environment 200.

In some implementations, the electronic device 210 semantically identifies a portion of the physical environment 200 that satisfies a proximity threshold with respect to the free hand 52. For example, with reference to FIG. 2D, the electronic device 210 semantically identifies the basketball 224 because the basketball 224 is a threshold distance from the free hand 52. On the other hand, in some implementations, the electronic device 210 foregoes semantically identifying the basketball hoop 202 because the basketball hoop 202 is not within the threshold distance from the free hand 52. Accordingly, in some implementations, the electronic device 210 utilizes fewer resources by selectively identifying objects within the physical environment 200.

The electronic device 210 determines an interaction event based on a function of the semantic identifier that is associated with the basketball 224. For example, the interaction event indicates that the free hand 52 is holding the basketball 224. In some implementations, as will be described with reference to FIGS. 2E-2H, the interaction event is further based on respective movements of the free hand 52 and the basketball 224.

Figure 2E:
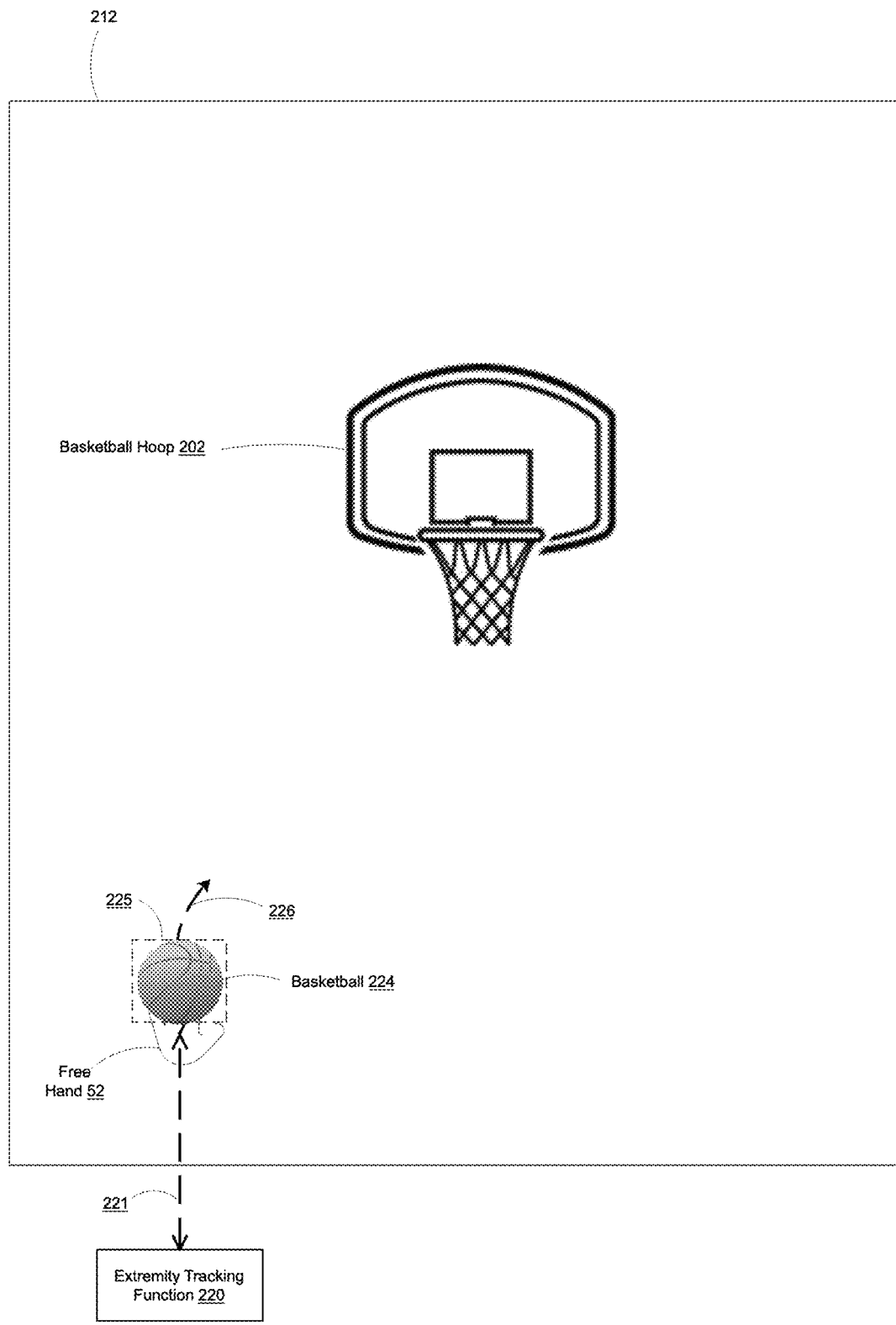
Figure 2F:
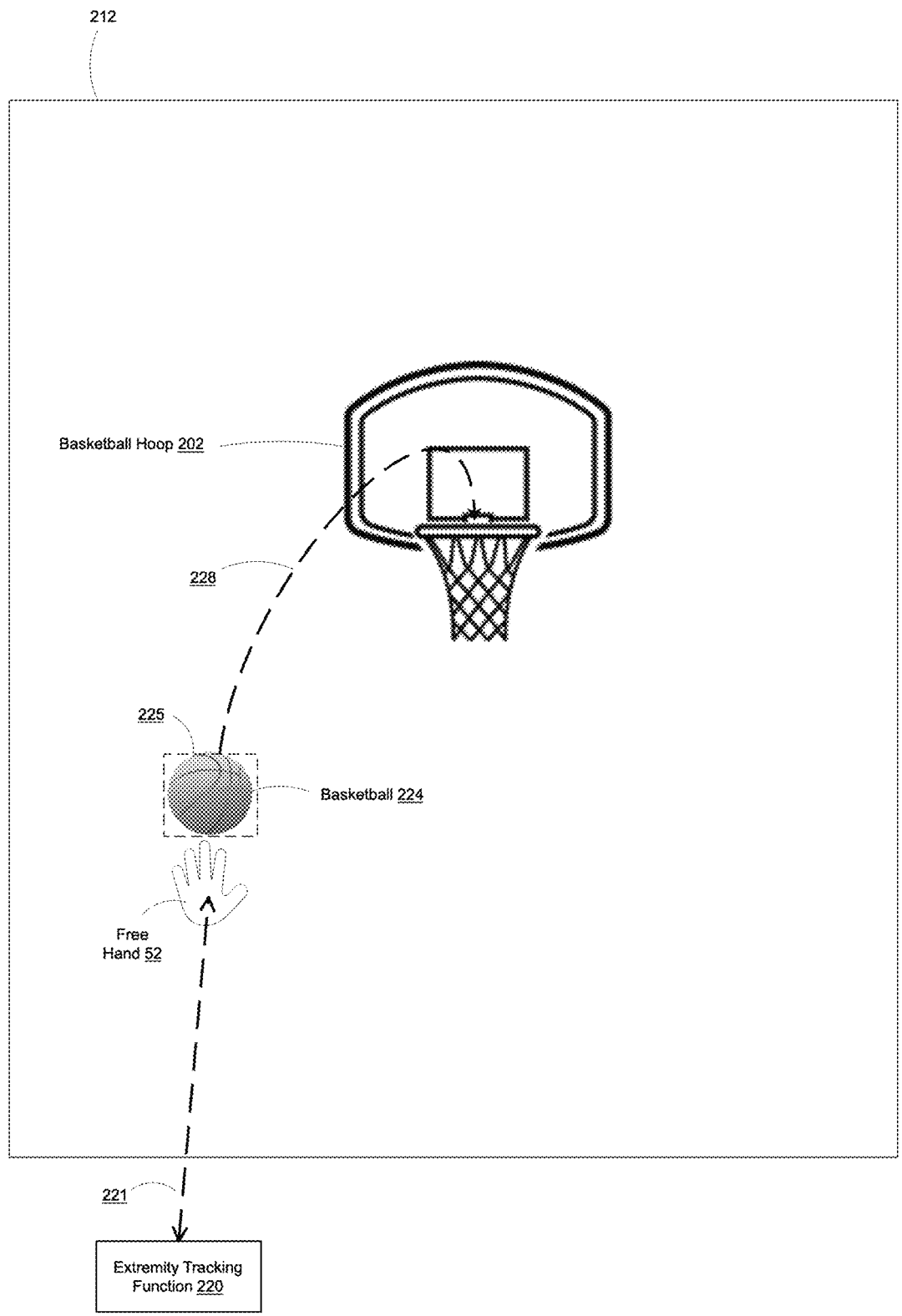

As illustrated in FIGS. 2E and 2F, the extremity tracking function 220 of the electronic device 210 tracks the free hand 52 while the free hand 52 shoots the basketball 224 towards the basketball hoop 202, as is indicated by shooting line 226. The shooting line 226 is illustrated for purely explanatory purposes. As illustrated in FIG. 2F, the free hand 52 finishes the shot and stops moving, while the basketball 224 continues on a trajectory towards the basketball hoop 202. The trajectory of the basketball 224 is indicated by trajectory line 228, which is illustrated for purely explanatory purposes. In some implementations, the electronic device 210 continues to track the semantically identified basketball, as is indicated by the object box 225 shown in FIGS. 2F-2H.

Figure 2G:
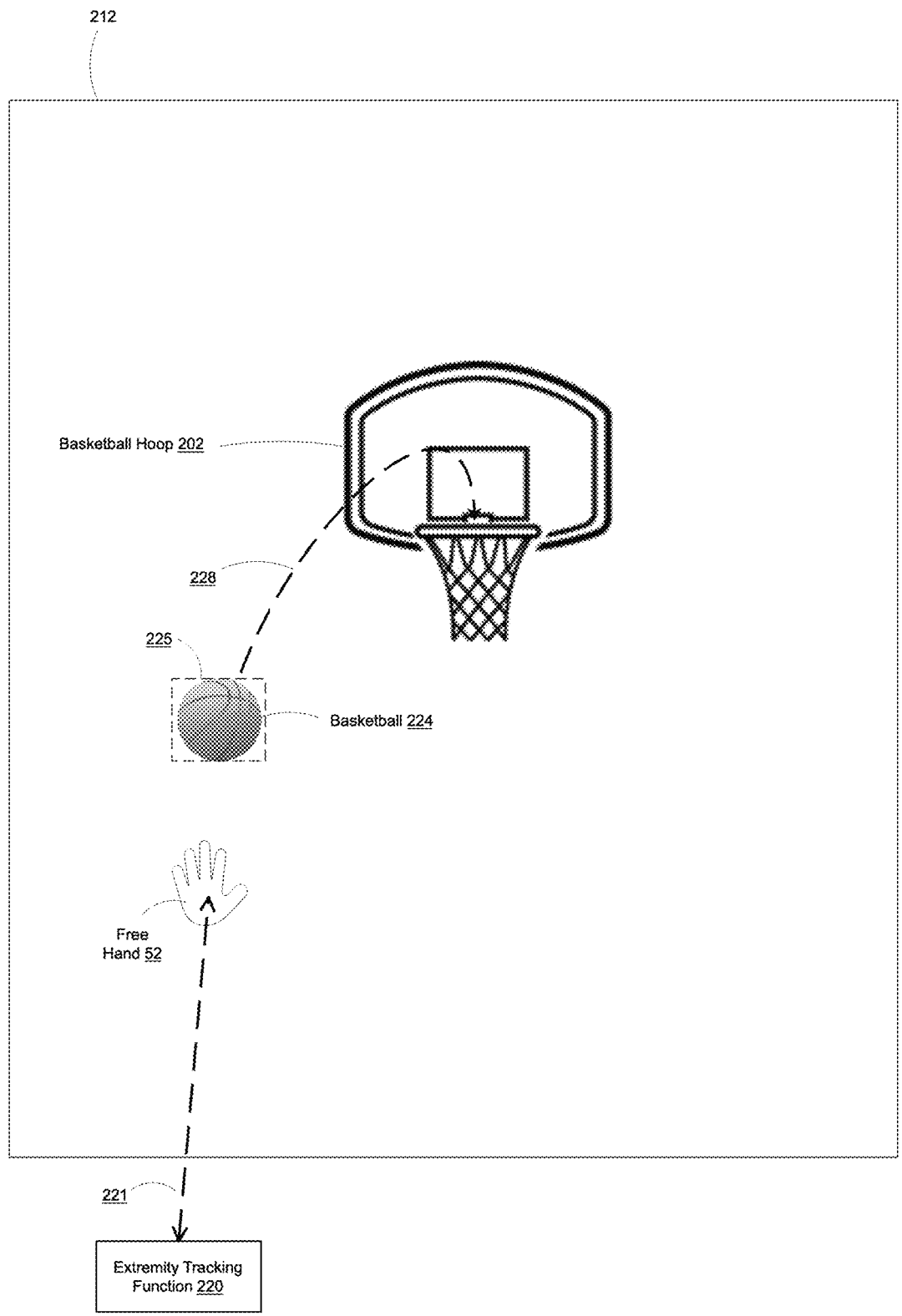
Figure 2H:
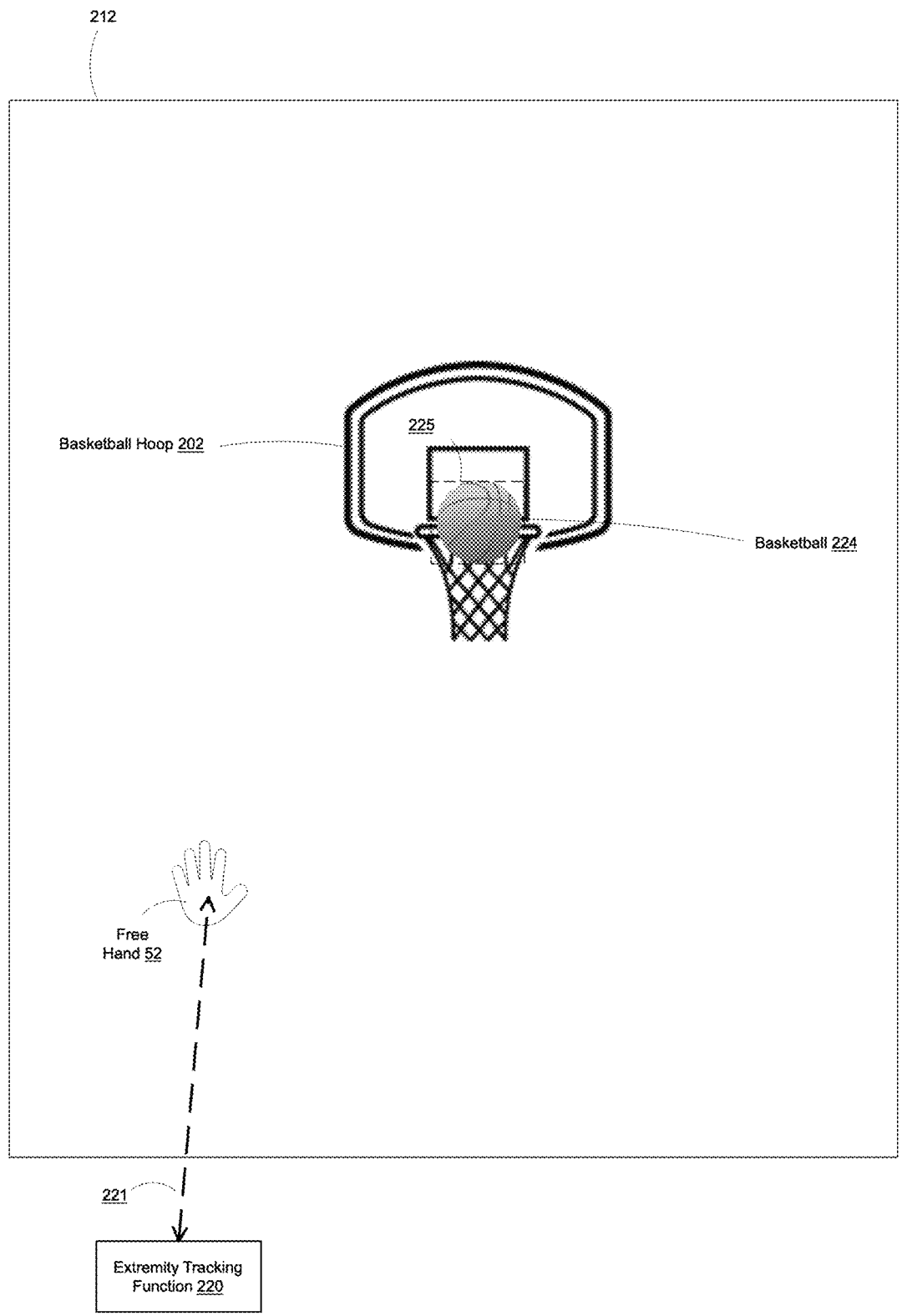

As illustrated in FIGS. 2G and 2H, the basketball 224 travels away from the free hand 52 into the basket of the basketball hoop 202. In some implementations, based on the tracking of the basketball 224 relative to the basketball hoop 202, the electronic device 210 determines that the user 50 scored the basket and updates the interaction event accordingly. In some implementations, the electronic device 210 determines a temporal characteristic (e.g., "26 seconds ago," illustrated in FIG. 2I) associated with the interaction event, such as the cumulative amount of time that the free hand 52 is holding, shooting, or retrieving the basketball 224.

Figure 2I:
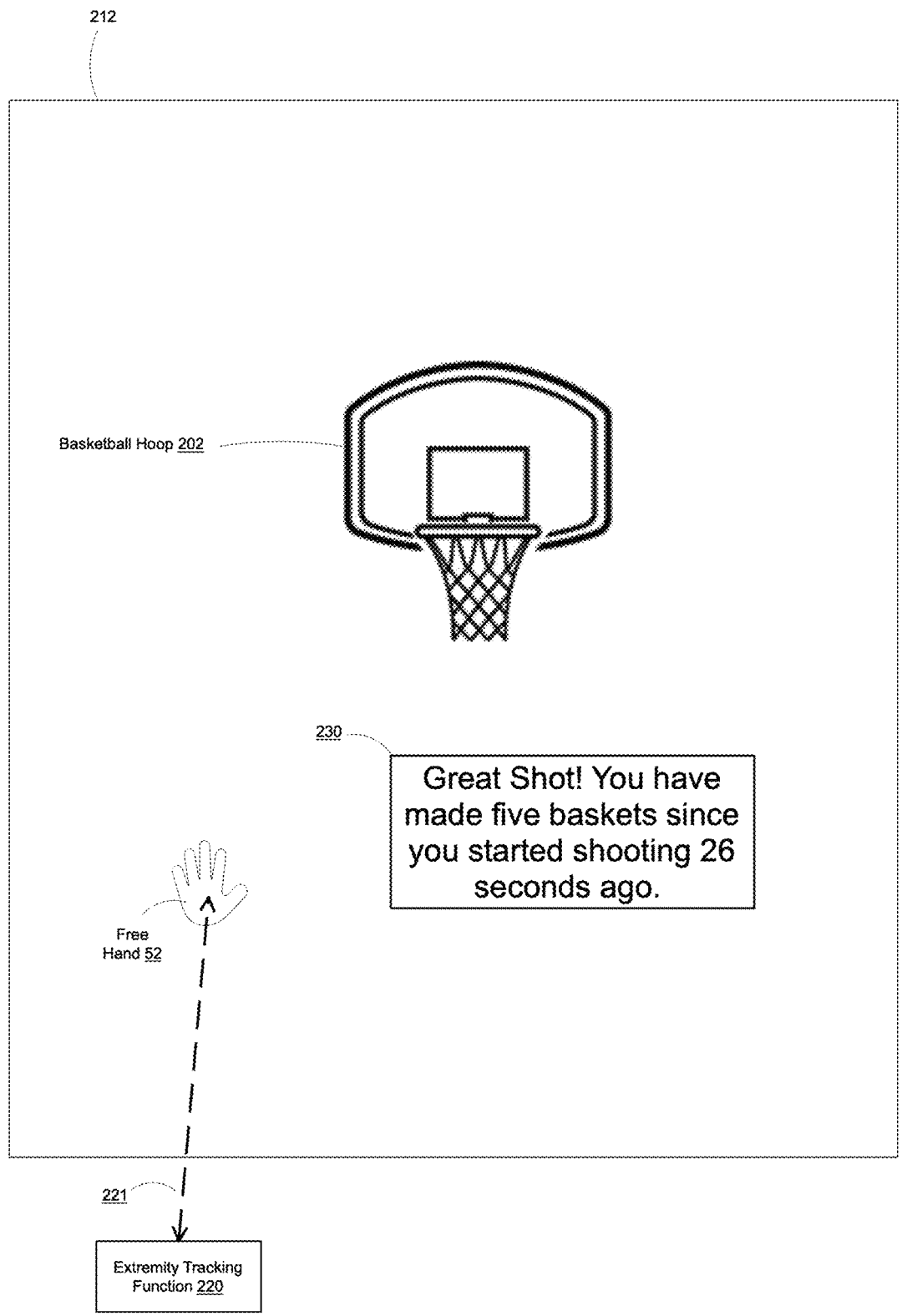

The electronic device 210 presents computer-generated content that is a function of the interaction event. For example, as illustrated in FIG. 2I, the display 212 of the electronic device 210 displays a computer-generated notification 230 indicating the number of successful shots ("five baskets") the user 52 has had since the user 52 began shooting the basketball 224 "26 second ago."

FIGS. 3A-3J are another example of presenting computer-generated content based on extremity tracking in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

Figure 3A:
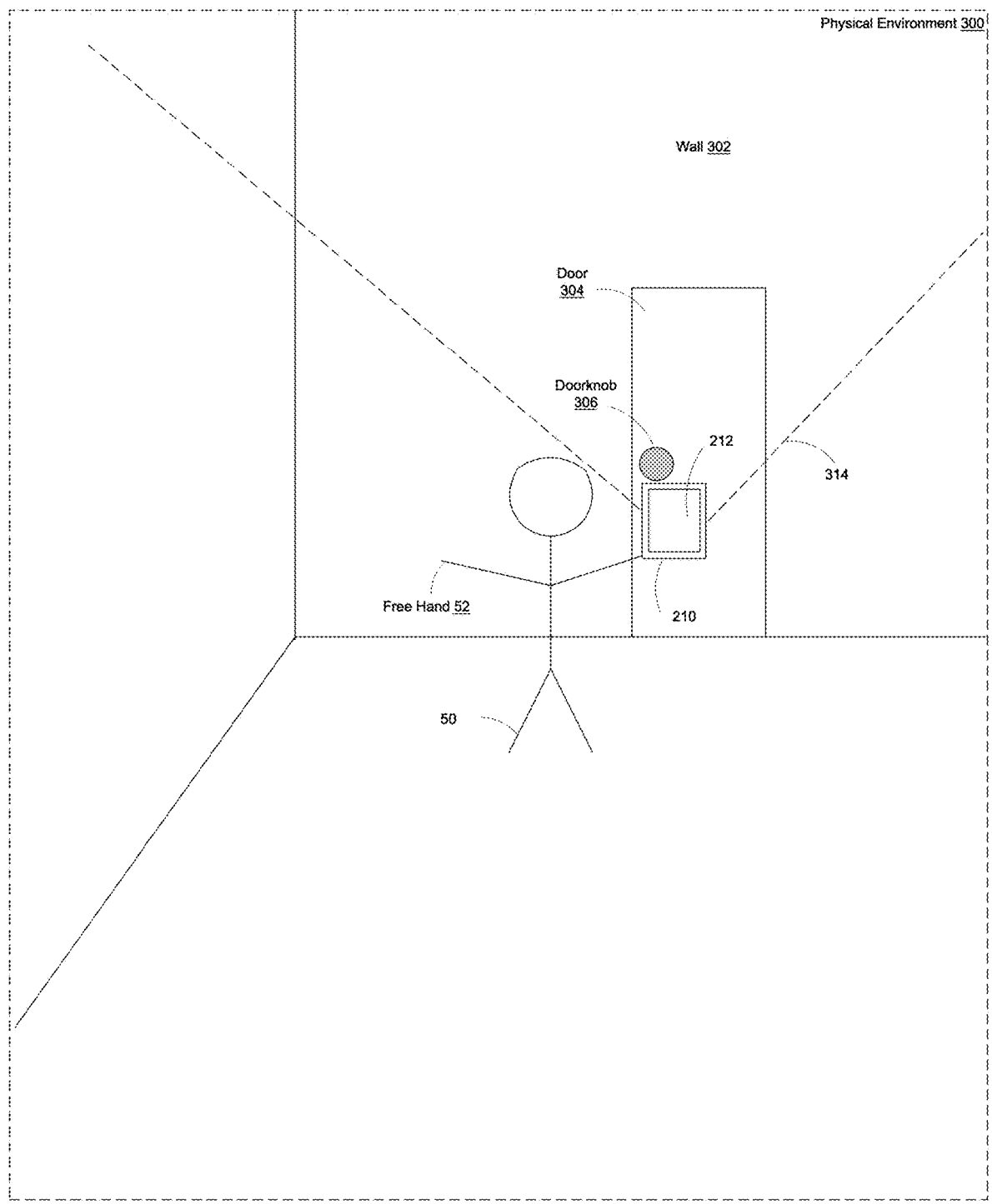
FIGS. 3A-3J are another example of presenting computer-generated content based on extremity tracking in accordance with some implementations.

As illustrated in FIG. 3A, a physical environment 300 includes a wall 302 and a door 304 including a doorknob 306. The physical environment 300 also includes the user 50 holding the electronic device 210 with the display 212.

Figure 3B:
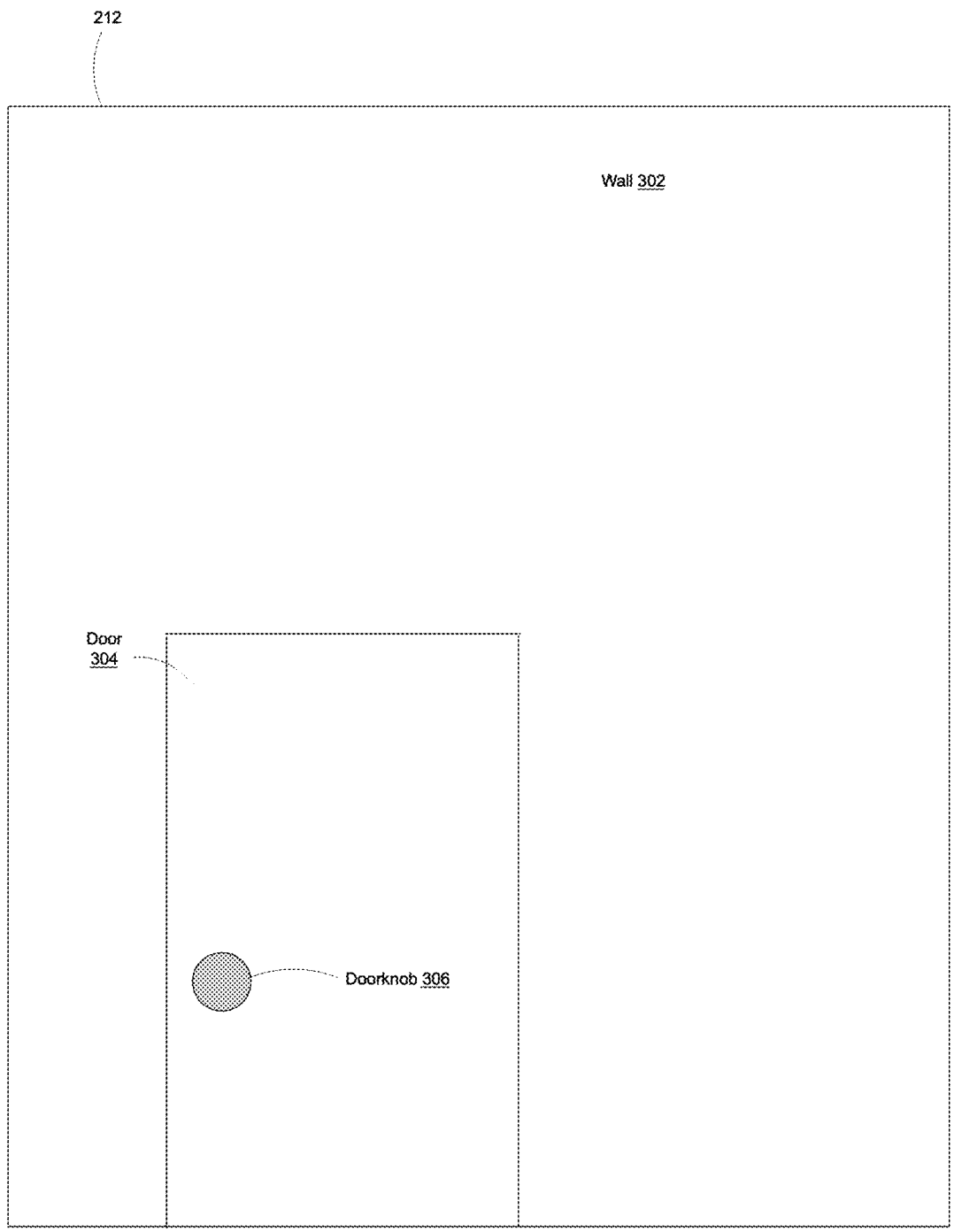

The display 212 is associated with a field-of-view 314 that includes a portion of the physical environment 300, which includes a portion of the wall 302, a portion of the door 304, and the doorknob 306. Accordingly, as illustrated in FIG. 3B, the display 212 displays a portion of the wall 302, a portion of the door 304, and the doorknob 306.

Figure 3C:
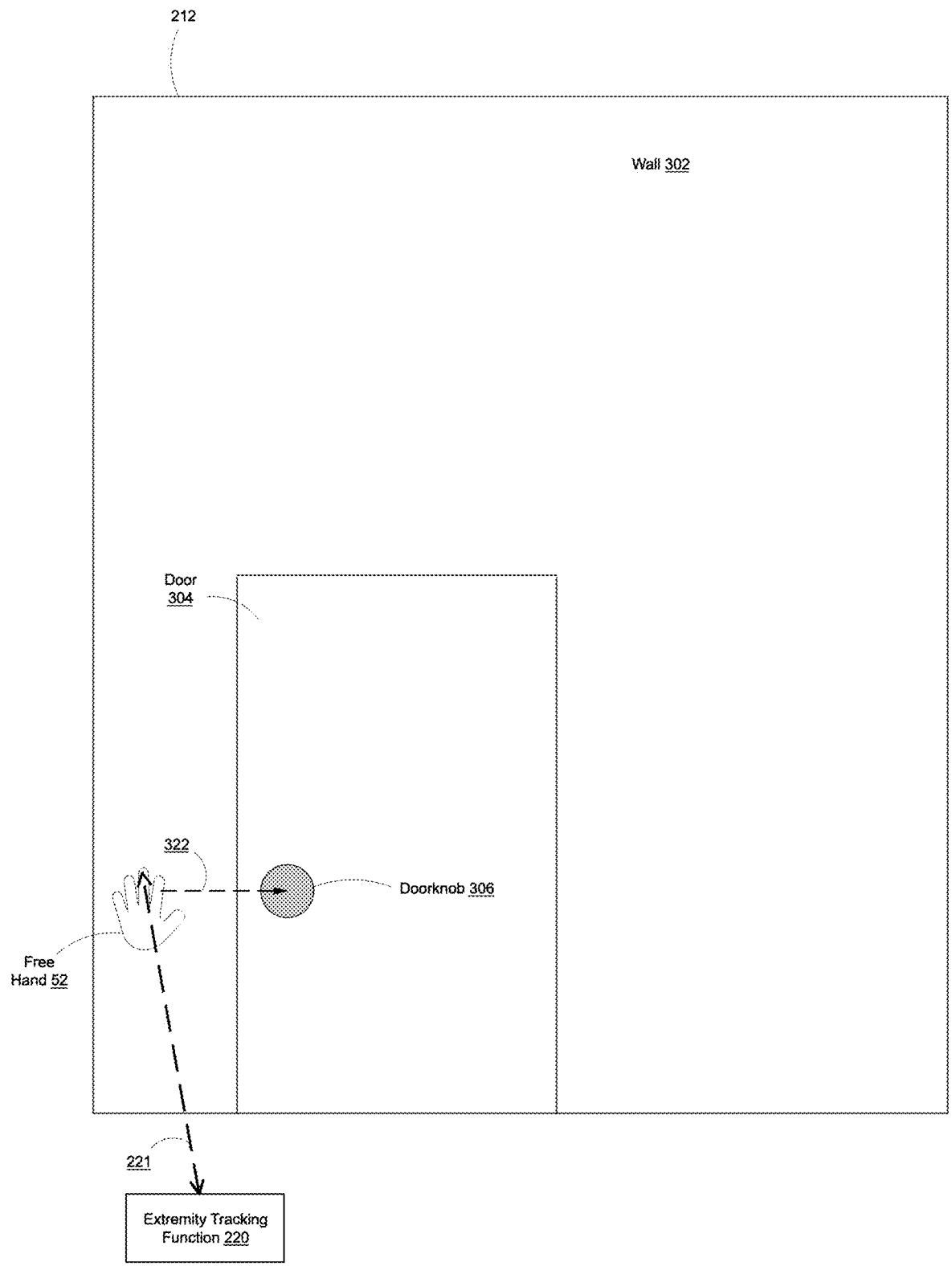

The free hand 52 of the user 50 moves within the field-of-view 314. Accordingly, as illustrated in FIG. 3C, the display 212 displays the free hand 52. The extremity tracking function 220 tracks the free hand 52 within the physical environment 300, as is indicated by the tracking line 221 (illustrated for purely explanatory purposes). The free hand 52 begins moving towards the doorknob 306, as is indicated by movement line 322. The movement line 322 is illustrated for purely explanatory purposes. As the free hand 52 moves towards the doorknob 306, the extremity tracking function 220 tracks the free hand 52.

Figure 3D:
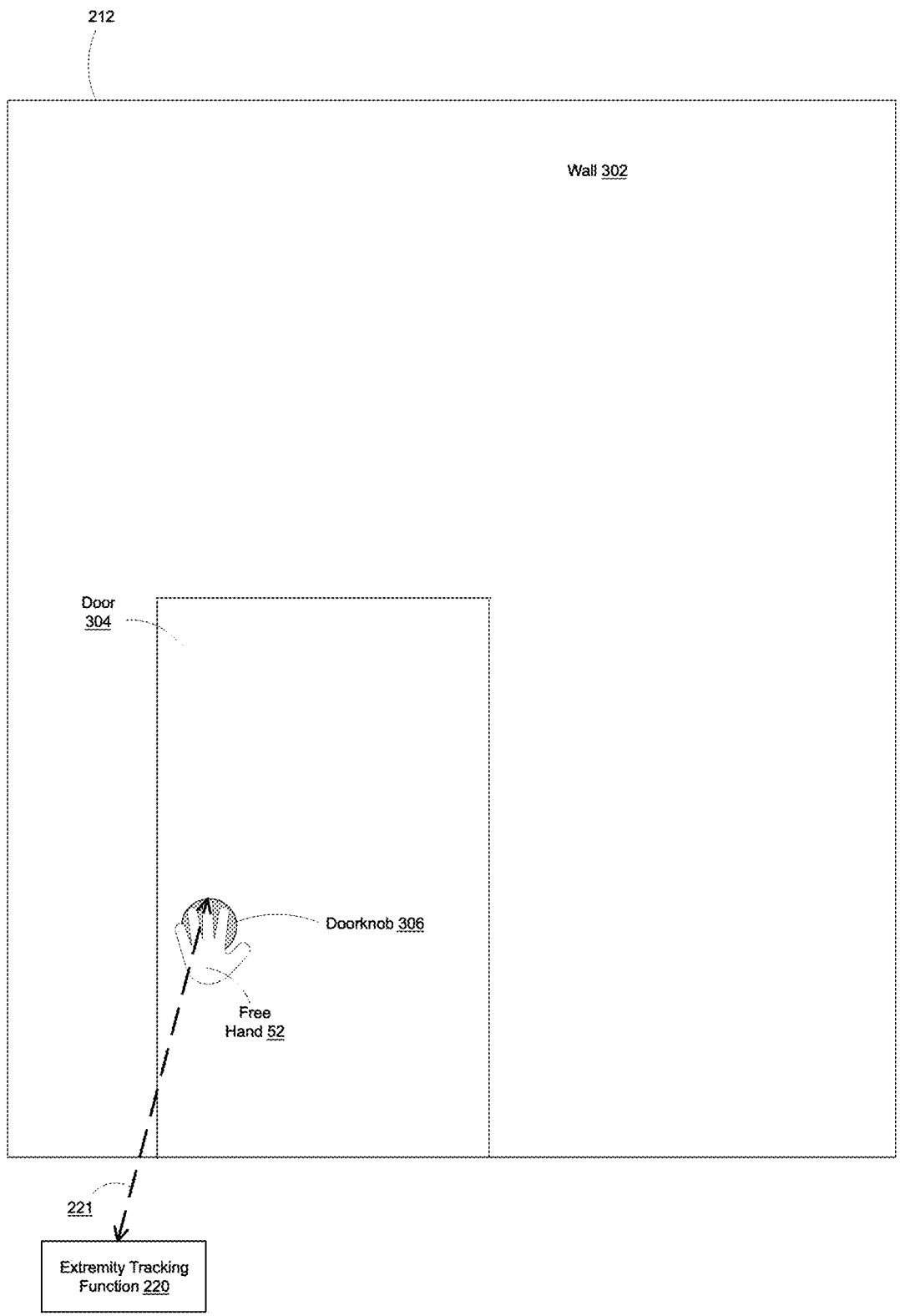

As illustrated in FIG. 3D, the free hand 52 has reached the doorknob 306. Thus, the extremity tracking function 220 identifies a spatial location of the physical environment 300 that includes the doorknob 306.

Figure 3E:
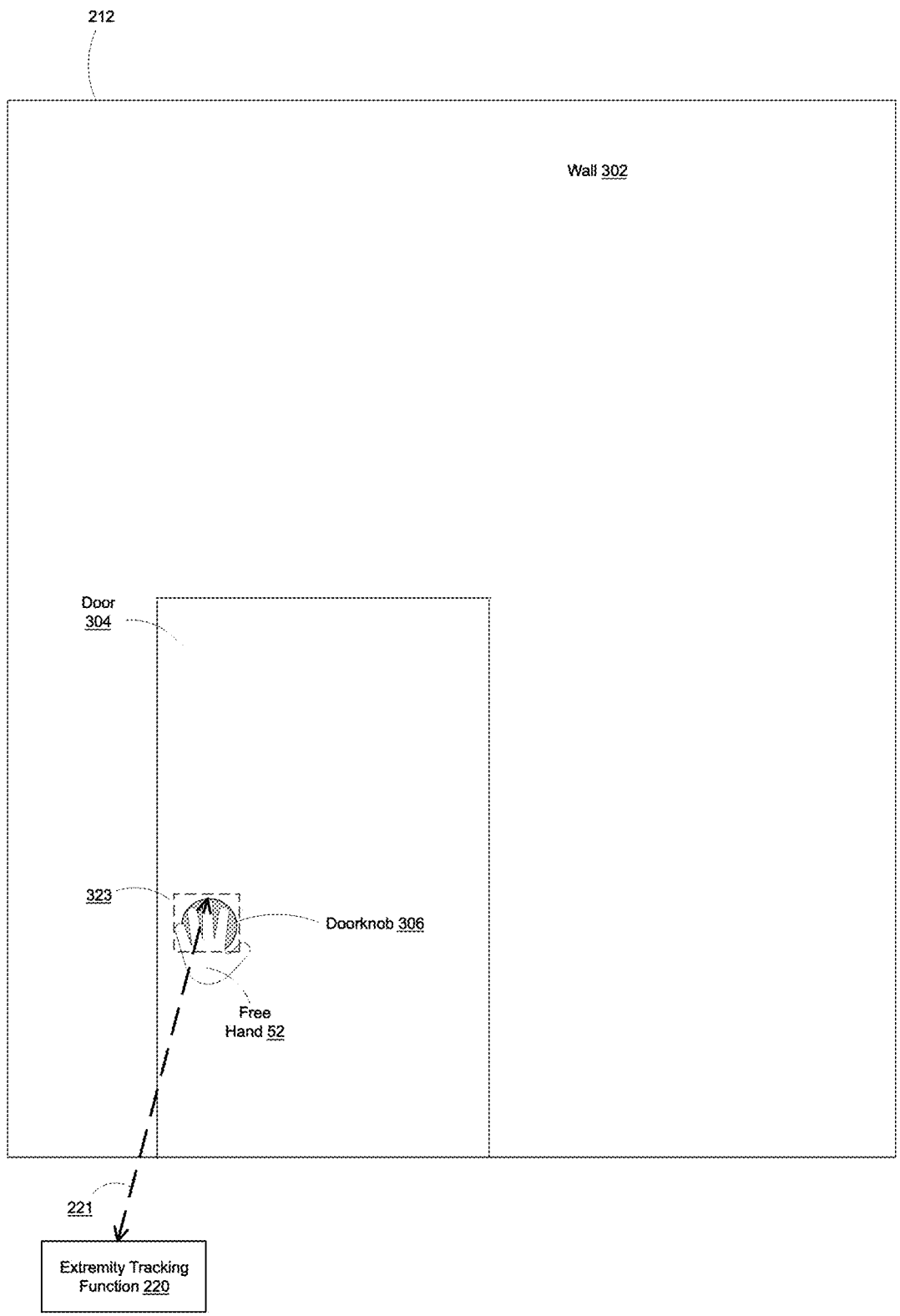

Moreover, as illustrated in FIG. 3E, the electronic device 210 obtains a semantic identifier ("doorknob") associated with the doorknob 306, as is indicated by object box 323. The object box 323 is illustrated for purely explanatory purposes. For example, the electronic device 210 determines that the doorknob 306 is a suitable target for semantically identification because the free hand 52 is less than a threshold distance away from the doorknob 306. In some implementations, in response to semantically identifying the doorknob 306, the electronic device 210 determines an interaction event that indicates that the free hand 52 has touched or is touching the doorknob 306.

Figure 3F:
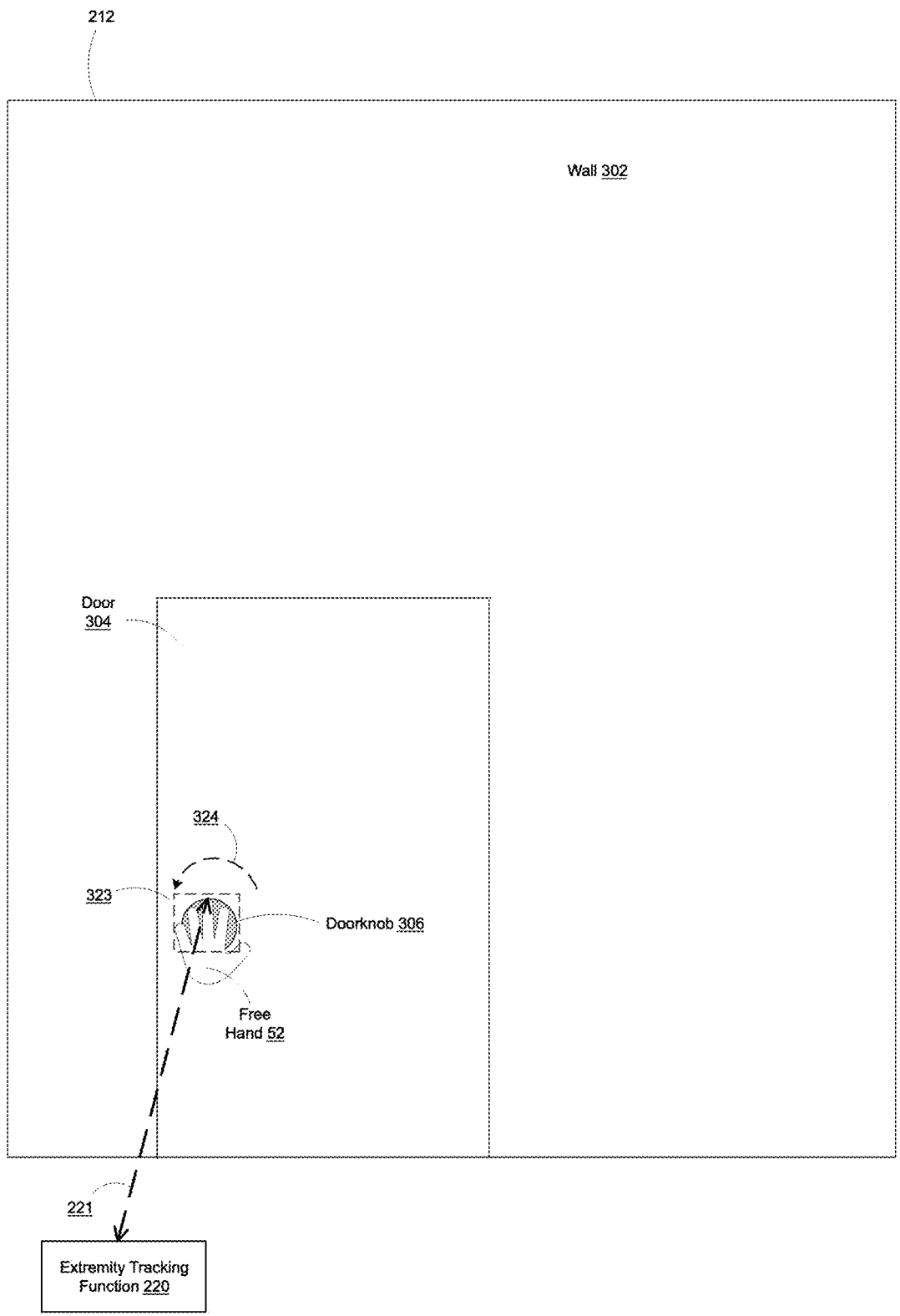

As illustrated in FIG. 3F, the free hand 52 begins to turn the doorknob 306 counterclockwise, as is indicated by rotational indicator 324. The rotational indicator 324 is illustrated for purely explanatory purposes. While the free hand 52 turns the doorknob 306, the extremity tracking function 220 tracks the free hand 52, such as by tracking respective positions/angles of the fingers of the free hand 52. For example, in some implementations, the extremity tracking function 220 tracks fingers of the free hand 52 relative to each other. As another example, in some implementations, extremity tracking function 220 tracks fingers of the free hand 52 relative to the physical environment 300 as a whole. Tracking the free hand 52 in this way enables the electronic device 210 to determine that the free hand 52 is turning the doorknob 306.

In some implementations, in response to determining that the free hand 52 is turning the doorknob 306, the electronic device 210 accordingly modifies the interaction event. For example, the electronic device 210 updates the interaction event to indicate that the free hand 52 is rotating the doorknob 306 counterclockwise.

Figure 3G:
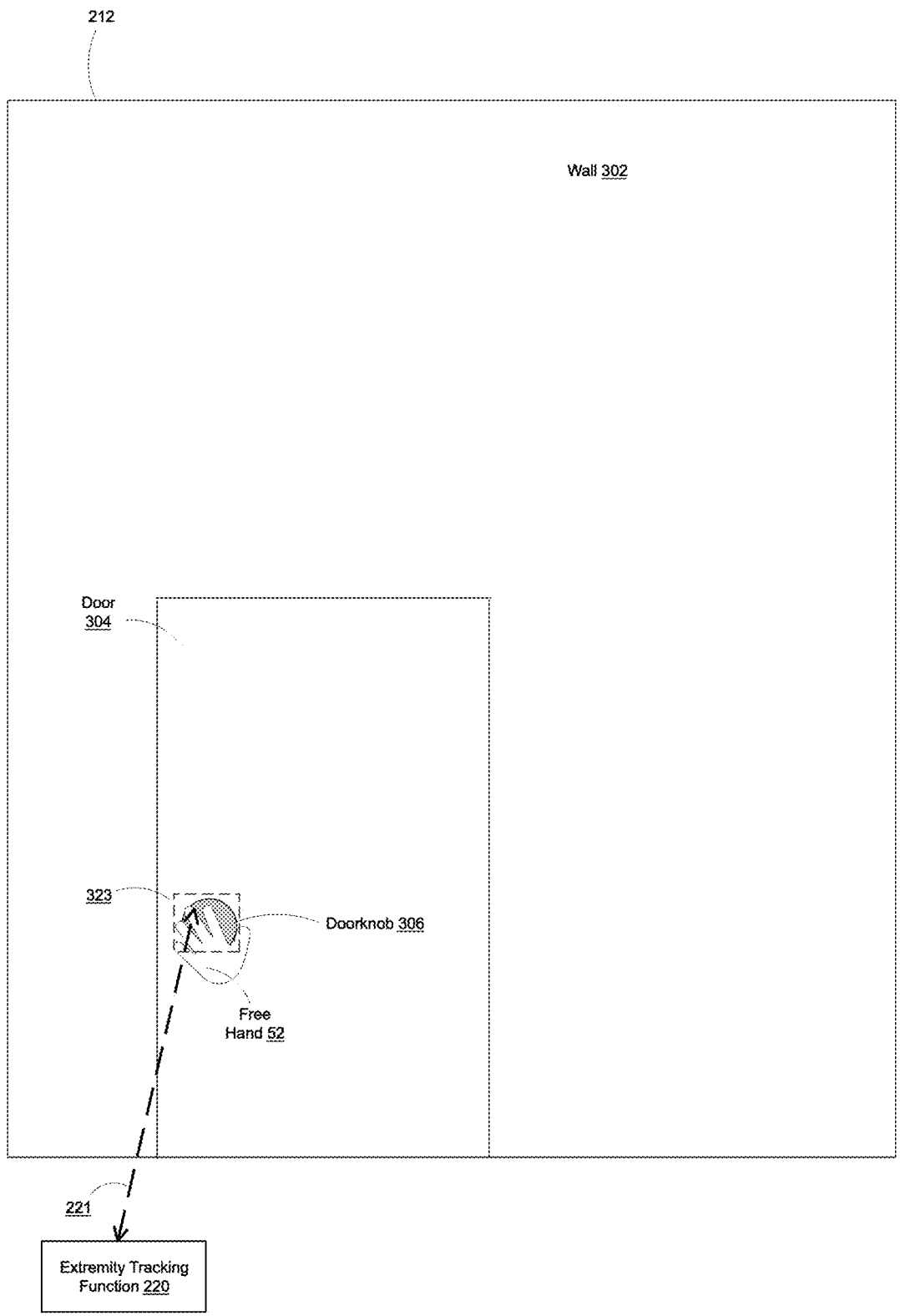

As illustrated in FIG. 3G, the free hand 52 completes turning the doorknob 306 counterclockwise. Thus, the free hand 52 illustrated in FIG. 3G has a different angular orientation (e.g., turned counterclockwise) as compared with the free hand 52 illustrated in FIG. 3F.

Figure 3H:
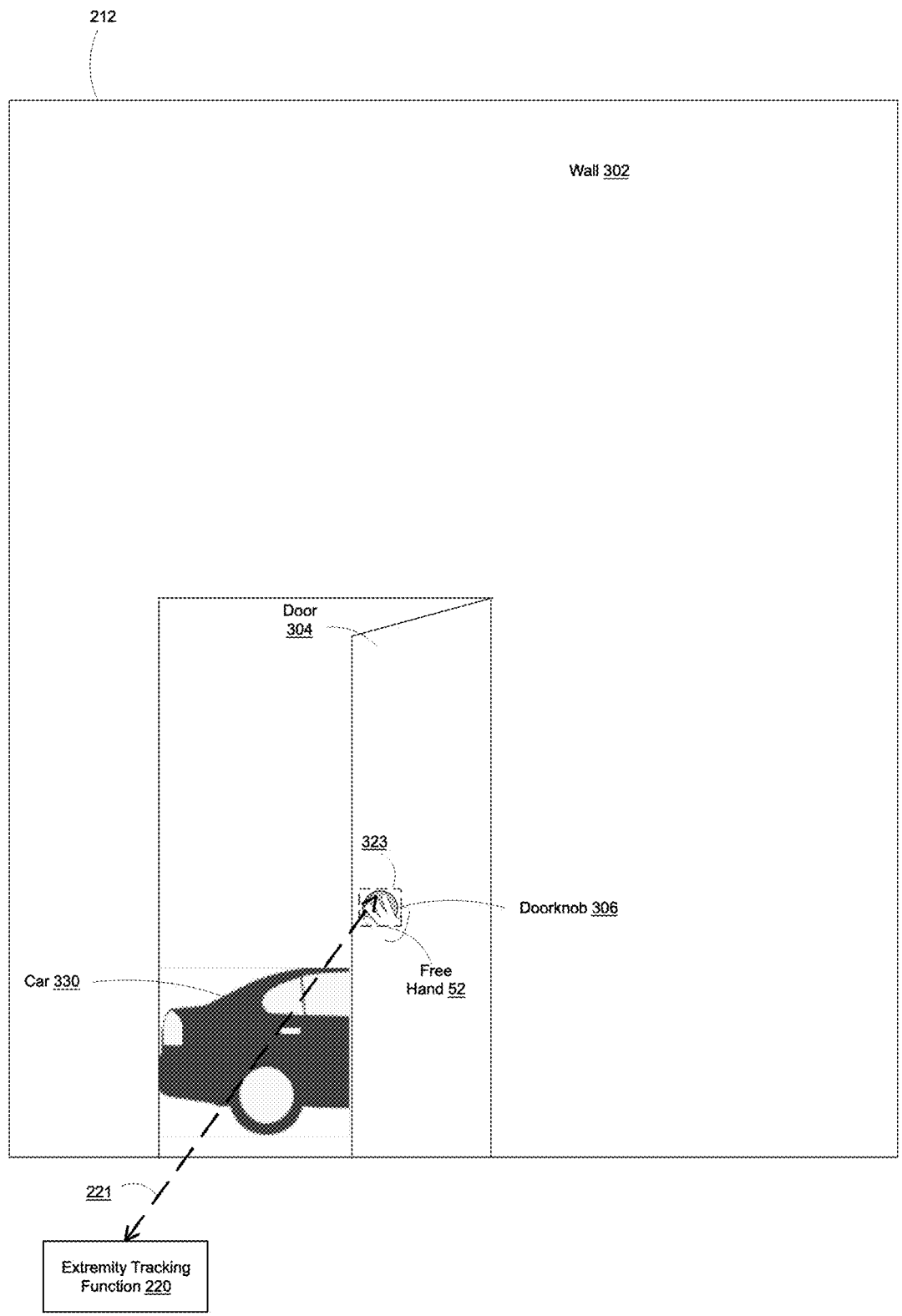
Figure 3I:
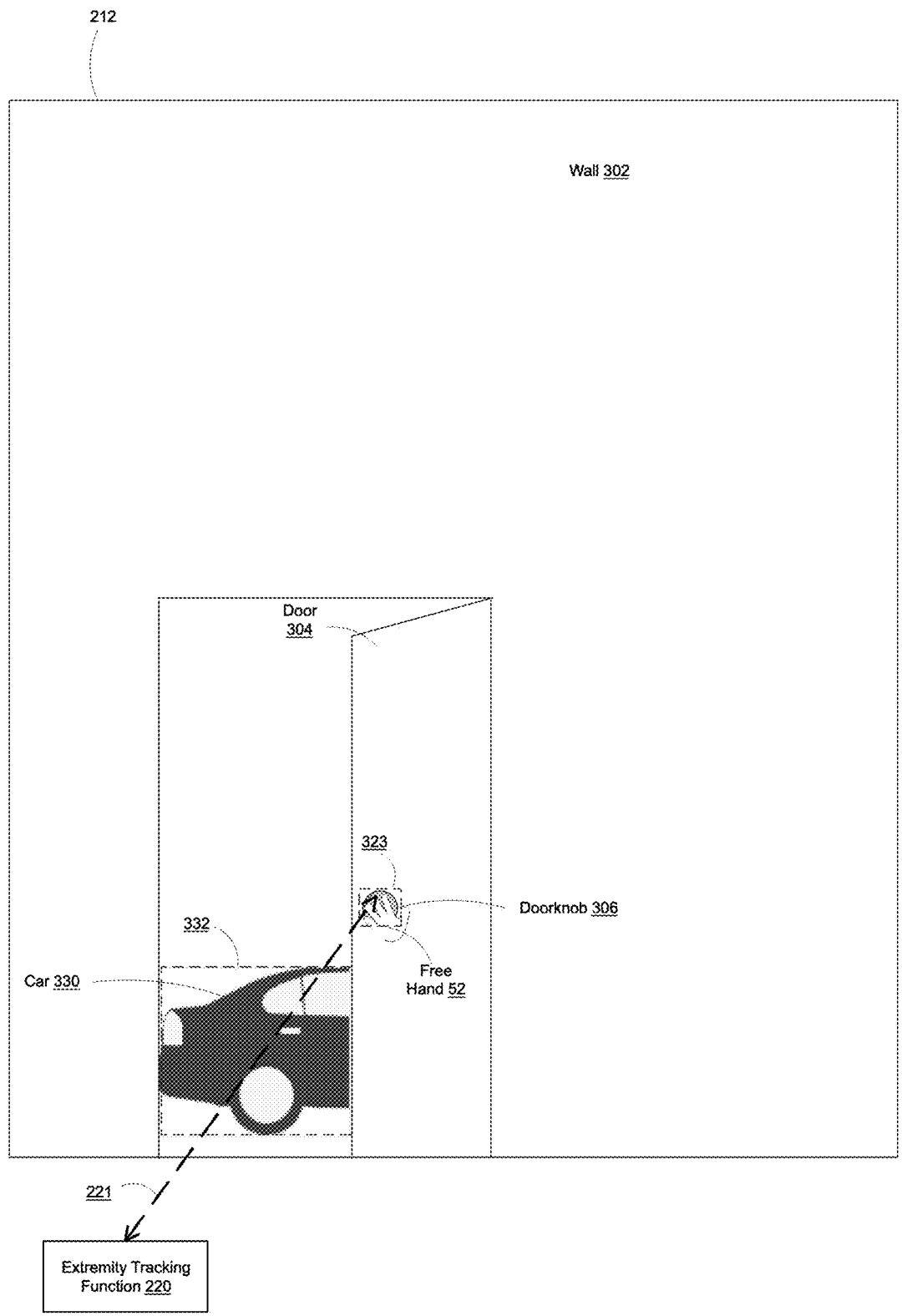

As illustrated in FIG. 3H, the extremity tracking function 220 tracks the free hand 52 opening (e.g., pushing outwards) the door 304, revealing a car 330. In some implementations, as illustrated in FIG. 3I, the electronic device 210 semantically identifies the car 330, as is indicated by object box 332. The object box 332 is illustrated for purely explanatory purposes. In some implementations, in response to semantically identifying the car 330, the electronic device 210 accordingly modifies the interaction event. For example, the electronic device 210 updates the interaction event to indicate that the car 330 is within the physical environment 300. Accordingly, in some implementations, the interaction event is a function of a scene object that is beyond a threshold distance from the free hand 52.

Figure 3J:
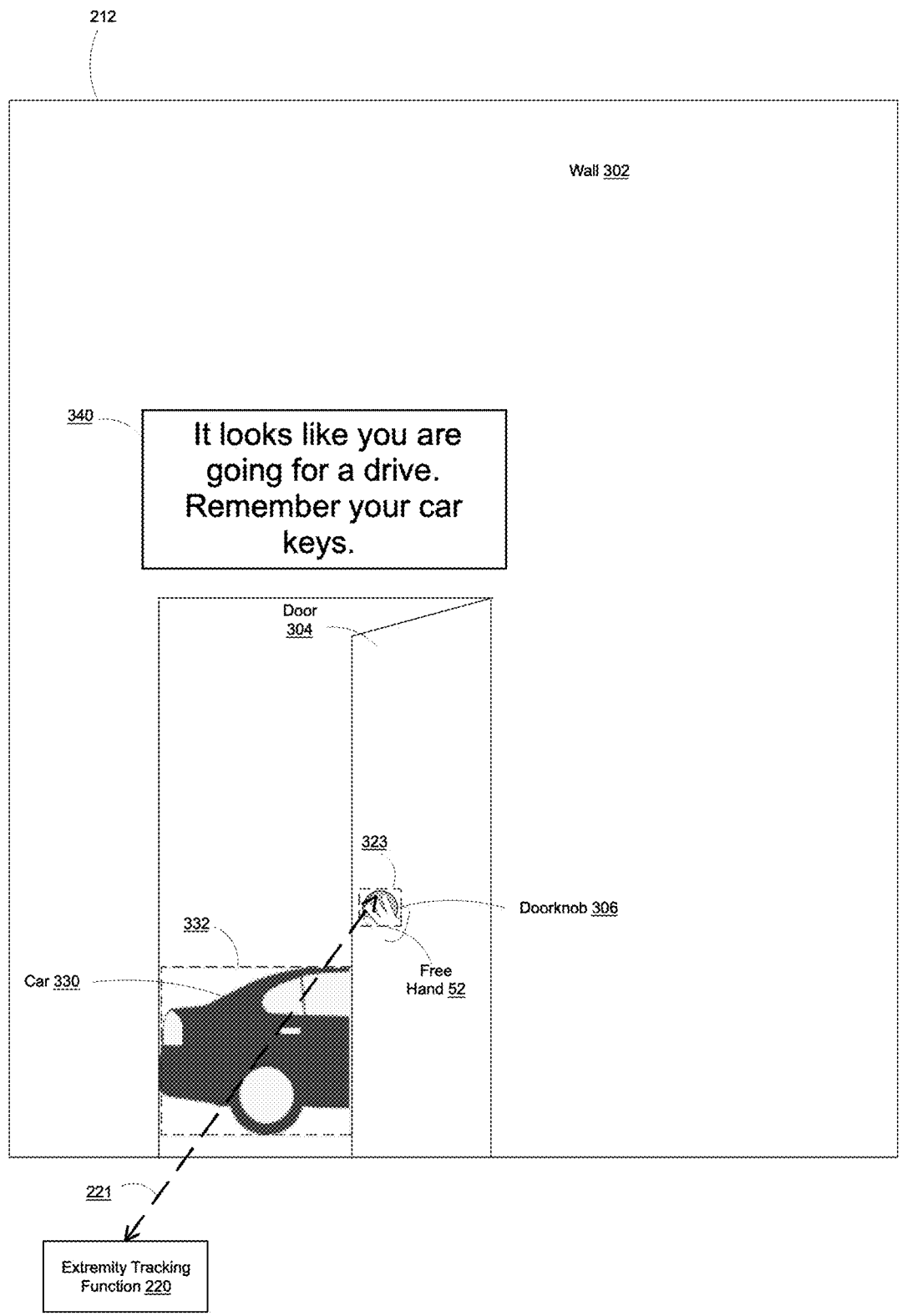

As illustrated in FIG. 3J, the electronic device 210 displays, on the display 212, computer-generated content 340 that is a function of the interaction event, as discussed above. Namely, because the interaction event indicates that the free hand 52 has opened the door 304, revealing the car 330, the electronic device 210 determines (e.g., infers) that the user 50 may be planning on driving the car 330. Accordingly, the computer-generated content 340 provides a suggestion to the user 50: "Remember your car keys."

Figure 4:
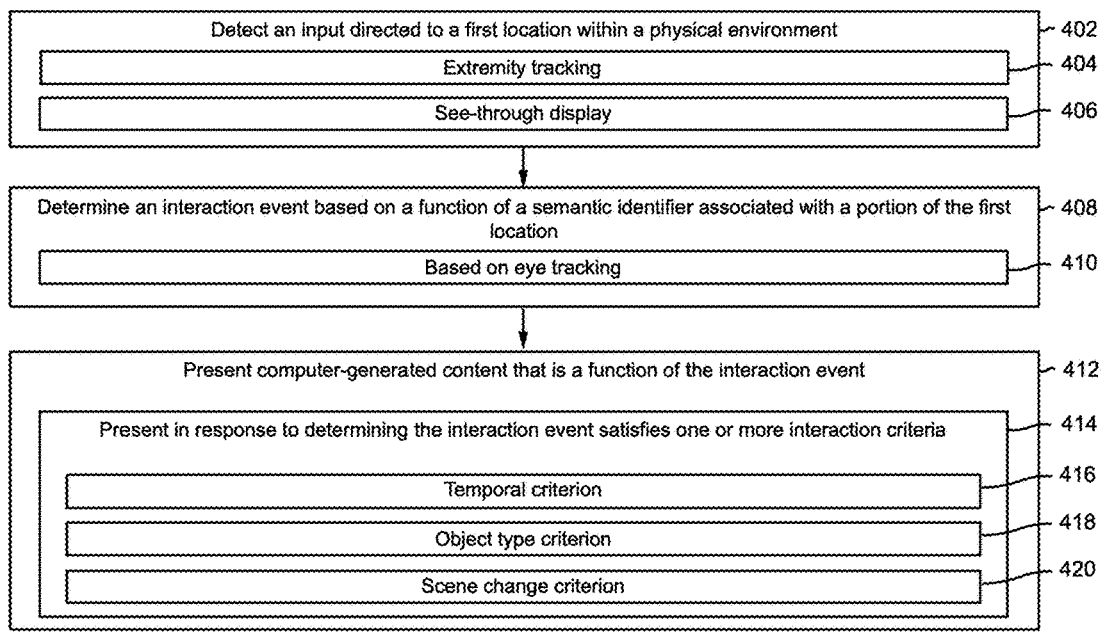
FIG. 4 is an example of a flow diagram of a method of presenting computer-generated content based on extremity tracking in accordance with some implementations.

FIG. 4 is an example of a flow diagram of a method 400 of presenting computer-generated content based on extremity tracking in accordance with some implementations. In various implementations, the method 400 or portions thereof are performed by an electronic device (e.g., the electronic device 100 in FIG. 1 or the electronic device 210 in FIGS. 2A-2I and FIGS. 3A-3J). In various implementations, the method 400 or portions thereof are performed by an HMD. In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes detecting, via a first input device, an input directed to a first location within a physical environment. As represented by block 404, the first location is identified by an extremity tracking function based on the input. For example, the first location corresponds to one of a surface, point, region, voxel, and/or the like. As one example, with reference to FIG. 3C, the extremity tracking function 220 identifies a first location of the free hand 52, which is positioned to the left of the doorknob 306. Moreover, the extremity tracking function 220 tracks the free hand 52, and identifies a second location of the free hand 52 corresponding to (e.g., positioned at) the doorknob 306, as illustrated in FIG. 3D.

In some implementations, as represented by block 406, the method 400 is performed by a head-mountable device (HMD) that includes a see-through display. The see-through display permits ambient light from the physical environment through the see-through display, and the physical environment is a function of the ambient light. For example, the see-through display is a translucent display, such as glasses with optical see-through. In some implementations, the see-through display is an additive display that enables optical see-through of the physical surface, such as an optical HMD (OHMD). For example, unlike purely compositing using a video stream, the additive display is capable of reflecting projected images off of the display while enabling the user to see through the display. In some implementations, the see-through display includes a photochromic lens.

In some implementations, the method 400 is performed by an electronic device that includes an image sensor. The image sensor obtains image data characterizing the physical environment. The extremity tracking function may be based on the image data.

As represented by block 408, the method 400 includes determining an interaction event based on a function of a semantic identifier that is associated with a portion of the first location. For example, the semantic identifier provides a meaning or understanding with respect to the portion of the first location. As one example, with reference to FIG. 2D, the electronic device 210 semantically identifies the basketball 224 corresponding to the current location of the free hand 52, as is indicated by object box 225. As another example, with reference to FIG. 3E, the electronic device 210 semantically identifies the doorknob 306 corresponding to the current location of the free hand 52, as is indicated by object box 323. In some implementations, the semantic identifier identifies an object within or proximate to the first location. In some implementations, the method 400 includes performing semantic segmentation or other computer-vision based techniques in order to determine the semantic identifier.

In some implementations, the interaction event is indicative of an extremity that contacts (e.g., touches) or is proximate to a portion of the first location. For example, as illustrated in FIG. 3D, the interaction event indicates that the free hand 52 contacts the doorknob 306.

In some implementations, the interaction event is additionally or alternatively indicative of an extremity that manipulates or moves an object, which is initially positioned at the first location. For example, as illustrated in FIGS. 3F and 3G, the interaction event indicates that the free hand 52 rotates the doorknob 306. As another example, as illustrated in FIGS. 2E and 2F, the interaction event indicates that the free hand 52 moves the basketball 224 upwards towards the basketball hoop 202.

In some implementations, the interaction event is additionally or alternatively indicative of movement of an object in response to an extremity manipulating or moving the object. For example, as illustrated in FIG. 2F-2H, the electronic device 210 tracks the basketball 224 after it has left the free hand 52. Accordingly, the electronic device 210 updates the interaction event to indicate that the user 50 successfully made the basket.

As represented by block 410, in some implementations, the method 400 also utilizes eye tracking in order to determine the interaction event. To that end, the method 400 includes detecting, via a second input device (e.g., the eye tracking sensor(s) 164 in FIG. 1), a second input directed to a second location within the physical environment. The second location is identified by an eye tracking function based on the second input. Determining the interaction event may be further based on a function of a semantic identifier that is associated with a portion of the second location. For example, in response to determining that the semantic identifier indicates that a user has been watching television for over two hours, an electronic device displays computer-generated content that includes a suggestion to "take a break from the television and go for a walk."

As represented by block 412, the method 400 includes presenting computer-generated content that is a function of the interaction event. In some implementations, the computer-generated content includes a suggestion, notification, or indication. In some implementations, the computer-generated content includes an indicator that is indicative of the interaction event, such as a temporal characteristic associated with the interaction event. For example, the electronic device displays an indicator indicating that "you have been playing the video game for three hours. You may want to take a break." In some implementations, presenting the computer-generated content includes displaying a computer-generated object, such as a selectable affordance. In some implementations, presenting the computer-generated content includes playing audio (e.g., via the speaker 111 in FIG. 1), such as a computer-generated audio clip or recorded voice data.

As represented by block 414, in some implementations, the method 400 includes presenting the computer-generated content in response to determining that the interaction event satisfies one or more interaction criteria. For example, the one or more interaction criteria characterize a transactional event or a liminal event, such as opening a door in order to enter a different room.

In some implementations, as represented by block 416, the method 400 includes presenting the computer-generated content in response to determining that a temporal characteristic, associated with the interaction event, satisfies a temporal criterion. For example, the temporal criterion is satisfied when the temporal characteristic indicates that the interaction event has been occurring for more than a threshold amount of time, such as a video game controller being held by an extremity for more than two hours.

In some implementations, as represented by block 418, the method 400 includes presenting the computer-generated content in response to determining that the semantic identifier satisfies an object type criterion. For example, the one or more interaction criteria are satisfied when the semantic identifier identifies an environment-change object (e.g., doorknob, car keys), entertainment object (e.g., television remote, video game controller), learning object (e.g., book), but not a large object (e.g., fixture, table) or structural element (e.g., wall, pillar, floor). For example, with reference to FIG. 3I, the electronic device 210 semantically identifies the car 330, and determines that the car 330 is an environment-change object because it likely indicates a change in environment from indoors to outdoors.

In some implementations, as represented by block 420, the method 400 includes presenting the computer-generated content in response to determining that the interaction event indicates a scene change that satisfies a scene change criterion. For example, with reference to FIGS. 3H and 3I, the electronic device 210 detects a scene change based a combination of detecting movement of the free hand 52 (e.g., pushing open the door 304) and semantically identifying the car 330. Moreover, the electronic device 210 determines that the scene change satisfies the scene change criterion because the revelation of the car 330 indicates that the user 50 is likely changing to a sufficiently different environment (e.g., from inside of a house to outside of the house).

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    at an electronic device including one or more processors, a non-transitory memory, and a first input device:
        detecting, via the first input device, an extremity directed to a first location within a physical environment, wherein the first location is identified by an extremity tracking function;
        identifying a physical feature of the physical environment proximate to the first location;
        determining and updating an interaction event between the extremity and the physical feature by tracking movements of the extremity and based on a semantic identifier that characterizes the physical feature of the physical environment; and
        presenting computer-generated content inferred from the interaction event tracking the movements of the extremity and a trajectory of the semantically identified physical feature interacted with the extremity.

2. The method of claim 1, further comprising determining whether or not the interaction event satisfies one or more interaction criteria, wherein presenting the computer-generated content is in response to determining that the interaction event satisfies the one or more interaction criteria.

3. The method of claim 2, further comprising determining a temporal characteristic associated with the interaction event, wherein determining whether or not the interaction event satisfies the one or more interaction criteria includes determining whether or not the temporal characteristic satisfies a temporal criterion.

4. The method of claim 3, wherein the computer-generated content is indicative of the temporal characteristic.

5. The method of claim 2, wherein determining whether or not the interaction event satisfies the one or more interaction criteria includes determining whether or not the semantic identifier satisfies an object type criterion.

6. The method of claim 2, wherein the interaction event indicates a scene change with respect to the physical environment, and wherein determining whether or not the interaction event satisfies the one or more interaction criteria includes determining whether the scene change satisfies a scene change criterion.

7. The method of claim 1, wherein the computer-generated content includes an indicator that is indicative of the interaction event.

8. The method of claim 1, wherein the electronic device includes one or more environmental sensors that obtain environmental data characterizing the physical environment, and wherein the extremity tracking function is based on the environmental data.

9. The method of claim 8, wherein the one or more environmental sensors include at least one of an image sensor or a depth sensor.

10. The method of claim 1, further comprising detecting, via a second input device, a second input directed to a second location within the physical environment, wherein the second location is identified by an eye tracking function based on the second input, and wherein determining the interaction event is further based on a semantic identifier that is associated with a portion of the second location.

11. The method of claim 1, wherein the electronic device corresponds to a head-mountable device (HMD) that includes a see-through display, and wherein the see-through display permits ambient light from the physical environment through the see-through display.

12. The method of claim 1, further comprising determining the semantic identifier via computer vision.

13. The method of claim 1, wherein the computer-generated content is presented at a second location different from the first location.

14. The method of claim 1, wherein determining the interaction event includes determining that the physical feature is less than a threshold distance from the first location of the extremity.

15. An electronic device comprising:
    one or more processors;
    a non-transitory memory;
    a first input device; and
    one or more programs, wherein the one or more programs are stored in the non-transitory memory and configured to be executed by the one or more processors, the one or more programs including instructions for:
        detecting, via the first input device, an extremity directed to a first location within a physical environment, wherein the first location is identified by an extremity tracking function;
        identifying a physical feature of the physical environment proximate to the first location;
        determining and updating an interaction event between the extremity and the physical feature by tracking movements of the extremity and based on a semantic identifier that characterizes the physical feature of the physical environment; and
        presenting computer-generated content inferred from the interaction event tracking the movements of the extremity and a trajectory of the semantically identified physical feature interacted with the extremity.

16. The electronic device of claim 15, wherein the one or more programs include instructions for determining whether or not the interaction event satisfies one or more interaction criteria, and wherein presenting the computer-generated content is in response to determining that the interaction event satisfies the one or more interaction criteria.

17. The electronic device of claim 16, wherein the one or more programs include instructions for determining a temporal characteristic associated with the interaction event, and wherein determining whether or not the interaction event satisfies the one or more interaction criteria includes determining whether or not the temporal characteristic satisfies a temporal criterion.

18. The electronic device of claim 17, wherein the computer-generated content is indicative of the temporal characteristic.

19. The electronic device of claim 16, wherein determining whether or not the interaction event satisfies the one or more interaction criteria includes determining whether or not the semantic identifier satisfies an object type criterion.

20. The electronic device of claim 16, wherein the interaction event indicates a scene change with respect to the physical environment, and wherein determining whether or not the interaction event satisfies the one or more interaction criteria includes determining whether the scene change satisfies a scene change criterion.

21. The electronic device of claim 15, wherein the computer-generated content includes an indicator that is indicative of the interaction event.

22. A non-transitory computer readable storage medium storing one or more programs, the one or more programs comprising instructions, which, when executed by an electronic device with one or more processors and a first input device, cause the electronic device to:
- detect, via the first input device, an extremity directed to a first location within a physical environment, wherein the first location is identified by an extremity tracking function;
- identify a physical feature of the physical environment proximate to the first location;
- determine and update an interaction event between the extremity and the physical feature by tracking movements of the extremity and based on a semantic identifier that characterizes the physical feature of the physical environment; and
- present computer-generated content inferred from the interaction event tracking the movements of the extremity and a trajectory of the semantically identified physical feature interacted with the extremity.

23. The non-transitory computer readable storage medium of claim 22, wherein the one or more programs include instructions for determining whether or not the interaction event satisfies one or more interaction criteria, and wherein presenting the computer-generated content is in response to determining that the interaction event satisfies the one or more interaction criteria.

24. The non-transitory computer readable storage medium of claim 23, wherein the one or more programs including instructions for determining a temporal characteristic associated with the interaction event, and wherein determining whether or not the interaction event satisfies the one or more interaction criteria includes determining whether or not the temporal characteristic satisfies a temporal criterion.

25. The non-transitory computer readable storage medium of claim 24, wherein the computer-generated content is indicative of the temporal characteristic.

26. The non-transitory computer readable storage medium of claim 23, wherein determining whether or not the interaction event satisfies the one or more interaction criteria includes determining whether or not the semantic identifier satisfies an object type criterion.

27. The non-transitory computer readable storage medium of claim 23, wherein the interaction event indicates a scene change with respect to the physical environment, and wherein determining whether or not the interaction event satisfies the one or more interaction criteria includes determining whether the scene change satisfies a scene change criterion.

28. The non-transitory computer readable storage medium of claim 22, wherein the computer-generated content includes an indicator that is indicative of the interaction event.

* * * * *